Patented Oct. 18, 1949

2,485,174

UNITED STATES PATENT OFFICE 2,485,174

BASIC SIDE CHAIN SUBSTITUTED QUINOLINE DERIVATIVE

Dean S. Tarbell, Rochester, and Nancy Shakespeare, Port Washington, N. Y., and Joseph F. Bunnett, Portland, Oreg., assignors, by mesne assignments, to the United States of America as represented by the Secretary of War.

No Drawing. Application April 8, 1946, Serial No. 660,418

2 Claims. (Cl. 260—288)

The present invention relates to a novel class of compounds characterized by superior antimalarial properties, and to methods of preparing the same.

Within the past several years, interest in the synthesis of antimalarial drugs has been greatly stimulated by the recently reported therapeutic properties of certain members of the acridine, the 4-aminoquinoline and the 8-aminoquinoline classes; notably 6-chloro-2-methoxy-9-(5-diethylaminopentyl-2-amino) acridine or "quinacrine"; 7-chloro-4-(5-diethylaminopentyl-2-amino) quinoline or "SN 7618"; and 8-(5'-isopropylaminopentylamino) - 6 - methoxy - quinoline or "SN 13276."

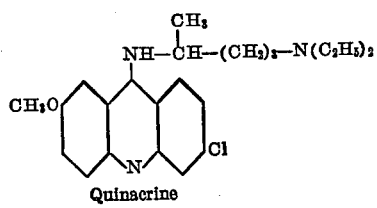
Quinacrine

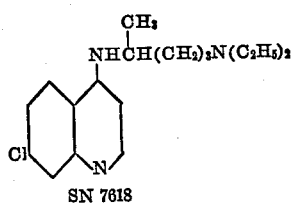
SN 7618

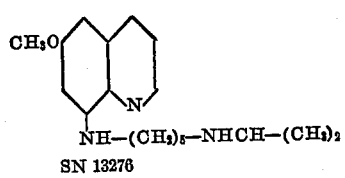
SN 13276

The outstanding therapeutic properties of quinacrine, SN–7618 and SN–13276 relative to quinine in the treatment of certain types of malaria has led to an intensive re-examination of other synthetic compounds in the hope that even more effective drugs might be developed.

Broadly stated, the object of the present invention is to provide a new and improved class of synthetic antimalarial drugs.

A more specific object is the provision of a novel class of 4-aminoquinoline compounds having suppressive antimalarial properties approximately equivalent to, or possibly somewhat greater than, those of SN 7618, but characterized by a significantly lower toxicity to the host or patient.

Another object is to provide suitable methods for the preparation of such drugs from readily available raw materials.

Other objects and advantages will be apparent as the description progresses.

It has been discovered, in accordance with the present invention, that the foregoing objects may be attained by the synthesis of compounds of the general type I

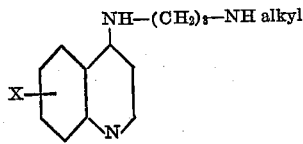
I wherein X is a nuclear substituent such as halogen (for example, chlorine) located preferably in position 7. Compounds of this type are highly active suppressive antimalarial drugs, being roughly equivalent in this respect to SN 7618, but are characterized by significantly lower toxicity than SN 7618. Surprisingly enough, the corresponding dialkylaminopropyl amino compounds of type II

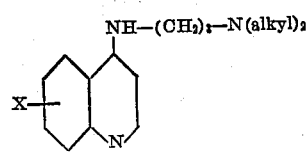
II are either less active as antimalarials or more toxic than SN 7618, or both.

The compounds of the present invention (I) may be readily prepared by condensing the appropriate diamine (III), with a 4,7-dihaloquinoline such as 4,7-dichloroquinoline (IV)

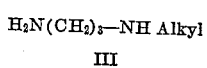 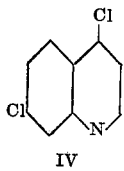

The diamines (III) may be prepared conveniently by the method of Holcomb and Hamilton [J. Am. Chem. Soc. 64, 1309 (1942)] which consists in addition of an amine to acrylonitrile, followed by catalytic reduced of the nitrile group:

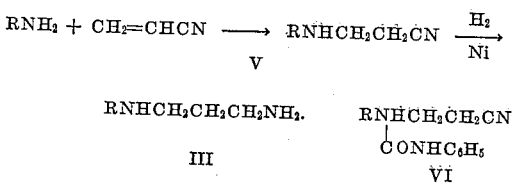

This reaction has usually been applied to secondary amines, but Whitmore et al. [J. Am. Chem. Soc. 66, 725 (1944)] made the compound from ethylamine, and there are a few scattered references in the patent literature to addition of primary amines to acrylonitrile, although the products are not well characterized.

The addition of the primary amines to acrylonitrile goes smoothly, without use of a catalyst, and our observations support Whitmore's statement that the addition is an equilibrium reaction. Even t-butylamine adds to acrylonitrile, although in somewhat lower yield than amines with a primary or secondary alkyl group.

The reduction of the nitriles (V) were carried out in the presence of a catalyst (for example, Raney nickel) under pressure (e. g., about 2500 lbs.) and at elevated temperatures (e. g., about 100–120° C.) preferably using alcohol saturated with ammonia to repress the formation of secondary amine. The reduction is usually complete in about fifteen minutes and the yields are good. The reaction of the diamines (III) with 4,7-dichloroquinoline (IV) proceeded with vigorous evolution of heat at a temperature of the order of about 150–160° C.

The foregoing general method may be applied to the preparation of a wide variety of compounds of the type (I). In order still more clearly to disclose the nature of the present invention, a specific example of the procedure used for the preparation of one embodiment will hereinafter be described in considerable detail. It should nevertheless be understood that this is done solely by way of example and not for the purpose of delineating the breadth of the invention or limiting the ambit of the appended claims.

EXAMPLE

Experimental procedures are similar for all the compounds of this type (I) and are illustrated for the n-butyl series; physical properties and analyses for the n-butyl compounds as well as a number of other related compounds are given in the various tables below. All melting points are corrected. Temperatures are given in degrees centigrade throughout the present case.

*n-Butylaminopropionitrile* (VR=n-$C_4H_9$).— Acrylonitrile (24.2 g.) was added dropwise with stirring during ninety minutes to 50 g. of n-butylamine, the temperature being kept below 30° C. by a cold-water bath. Stirring was continued for five hours after the addition was complete, the mixture was then refluxed on the steam bath for ninety minutes and allowed to stand overnight. Vacuum distillation of the mixture yielded 55.4 g. (98%) of n-butylaminopropionitrile.

The phenylurea derivatives were best prepared by adding 1 cc. of phenyl-isocyanate to 1 cc. of the nitrile dissolved in 10 cc. of petroleum ether; there was a vigorous reaction, and the product, if not crystalline immediately, became so on standing in the ice-box. The compounds were recrystallized from methanol-water or benzene-petroleum ether.

*γ-n-Butylaminopropylamine* (III, Alkyl=n-$C_4H_9$).—n-Butylaminopropionitrile (40 g.) was reduced in 150 cc. of alcohol saturated with ammonia, using Raney nickel at 120° C. and 2500 lbs. of hydrogen; the reduction was complete in about fifteen minutes. The catalyst was removed by filtration, most conveniently with the use of Super Filtrol, and the alcohol fractionated through a Vigreux column; 27.2 g. (66%) of the n-butylaminopropylamine was obtained. Yields for the reduction of the other nitriles ranged from about 55% to 70%. Analytical samples of the products of this and the preceding paragraph were obtained by fractionation in a small column under reduced pressure.

*7 - chloro - 4 - (3 - n - butylaminopropylamino) - quinoline* (I, Alkyl=n-$C_4H_9$; X=7-Cl).—n-Butylaminopropylamine (24.7 g.) and 17.8 g. of 4,7-dichloroquinoline were placed in a 250 cc. three-neck flask fitted with a condenser and a mercury-seal stirrer, and heated in an oil bath at about 155° C. After about fifteen minutes, a vigorous exothermic reaction occurred and it was necessary to cool the flask quickly with an ice bath. After the reaction had subsided, heating at about 155° C. was continued for five hours. An excess of 6 N sodium hydroxide was added and copious yellow precipitate formed. The mixture was steam distilled until the odor of amine was no longer detectable in the distillate. The solid material was removed and washed with water. It was then dissolved in hot acetone, treated with anhydrous sodium sulfate and Norite, and filtered. The crystals which formed on cooling melted at 91–101° C. Four recrystallizations from acetone yielded 13.4 grams (51.3%) of 7-chloro-4-(3-n-butylaminopropylamino)-quinoline, M. P. 100–103.5° C.

The other quinoline bases were likewise purified by repeated recrystallizations from acetone, in which 4,7-dichloroquinoline is very soluble; other solvents proved less useful.

*7-chloro- 4 -(3 - n - butylaminopropylamino) - quinoline monosulfate.*—7-chloro-4-(3-n-butylaminopropylamino)-quinoline (21.7 g.) was dissolved in 100 cc. of absolute alcohol and 23 cc. of 6 N $H_2SO_4$ was added with cooling, which formed a copious white precipitate of the monosulfate. Water (65 cc.) was added so that all the solid was in solution at the boiling point of the mixture. On cooling, the monosulfate was again precipitated. This was recrystallized four times from a mixture of 75 cc. of alcohol and 50 cc. of water. The purified compound was dried at about 115° C. in an oven overnight and yielded 20.5 g. (72.7%) of the dry monosulfate.

The following are the ratios of alcohol: water used to recrystallize the various compounds:

$CH_3$, 35:30; $C_2H_5$, 75:30; n-$C_3H_7$, 65:30; i-$C_3H_7$, 50:30; s-$C_4H_9$, 45:30; t-$C_4H_9$, 20:30.

TABLE I

β-Alkylaminopropionitriles, RNHCH$_2$CH$_2$CN

| R | Yield, Per Cent | B. P., °C. | $n_D^{20}$ | Formula | Calcd. % C | Calcd. % H | Found % C | Found % H |
|---|---|---|---|---|---|---|---|---|
| 1 CH$_3$ [a] | 71 | 101–104 (49 mm.) [b] | [b]1.4320 | C$_4$H$_8$N$_2$ | | | | |
| 2 C$_2$H$_5$ [a] | 84 | 97–98 (30 mm.) [c] | [c]1.4333 | C$_5$H$_{10}$N$_2$ | | | | |
| 3 n-C$_3$H$_7$ | 92 | 119–121 (30 mm.) | 1.4362 | C$_6$H$_{12}$N$_2$ | 64.22 | 10.80 | 64.13 | 10.71 |
| 4 n-C$_4$H$_9$ | 98 | 104–106 (10 mm.) [d] | 1.4392 | C$_7$H$_{14}$N$_2$ | 66.62 | 11.20 | 66.48 | 11.28 |
| 5 s-C$_4$H$_9$ | 83 | 92–96 (10 mm.) [e] | [e]1.4379 | ---do--- | | | | |
| 6 t-C$_4$H$_9$ | 56 | 81–83 (10 mm.) | 1.4329 | ---do--- | 66.62 | 11.20 | 66.60 | 11.37 |
| 7 C$_6$H$_{11}$ (Cyclohexyl) | 92 | 122–124 (4 mm.) [f] | 1.4764 | C$_9$H$_{18}$N$_2$ | 70.98 | 10.61 | 71.03 | 10.52 |

[a] In the preparations of methyl- and ethylaminopropionitrile, 33% amine in water was used instead of the pure amine. After standing overnight, 150 g. of anhydrous potassium carbonate was added for every 180 g. of water present, and the mixture was shaken until all the solid had dissolved. The organic layer was then distilled to yield the desired product.
[b] A. H. Cook and Reed, J. Chem. Soc., 399 (1945) report B. P. 74° (16 mm.); $n_D^{15}$ 1.4342.
[c] Whitmore et al. (supra) report B. P. 92–95° (30 mm.); $n_D^{20}$ 1.4318.
[d] French Patent 742,358 (C. A., 27, 3483 (1933)) reports a B. P. of 114–116° (20 mm.); German Patent 598,185 (C. A., 28, 5474 (1934)) gives it as 114–116° (12 mm.). No other information is given.
[e] Cope, private communication, reports B. P. 95° (13.5 mm.); $n_D^{25}$ 1.4340.
[f] French Patent 742,358 (C. A., 27, 3483 (1933)) reports B. P. 149–151° (11 mm.). The same value is given in German Patent 598,185 (C. A., 28, 5474 (1934)).

TABLE II

Phenylurea derivatives, RNCH$_2$CH$_2$CN
                        |
                        CONHC$_6$H$_5$

| R | M. P., °C. | Formula | Calcd. % C | Calcd. % H | Found % C | Found % H |
|---|---|---|---|---|---|---|
| CH$_3$ | 93.5–94.5 | C$_{11}$H$_{13}$N$_3$O | 65.00 | 6.45 | 64.91 | 6.54 |
| n–C$_3$H$_7$ | 81.5–82 | C$_{13}$H$_{17}$N$_3$O | 67.50 | 7.41 | 67.46 | 7.28 |
| i–C$_3$H$_7$ | 126–126.5 | ---do--- | 67.50 | 7.41 | 68.02 | 7.39 |
| n–C$_4$H$_9$ | 132.5–134 | C$_{14}$H$_{19}$N$_3$O | 68.53 | 7.81 | 68.62 | 7.66 |
| s–C$_4$H$_9$ | 127.5–128.5 | ---do--- | 68.53 | 7.81 | 68.54 | 7.76 |

TABLE III

γ-Alkylaminopropylamines, RNHCH$_2$CH$_2$CH$_2$NH$_2$

| R | B. P., °C. | $n_D^{20}$ | Dipicrate M. P., °C. | Formula | Calcd. % C | Calcd. % H | Found % C | Found % H |
|---|---|---|---|---|---|---|---|---|
| 1 CH$_3$ | 138–141 [a] | 1.4479 | [a] 224.5–226.5 | | | | | |
| 2 C$_2$H$_5$ | 150–151 [b] | [b]1.4455 | [b] 191–193 | | | | | |
| 3 n-C$_3$H$_7$ [c] | 169–174 | 1.4460 | 166.5–167.5 | C$_{18}$H$_{22}$N$_8$O$_{14}$ | 37.63 | 3.86 | 37.48 | 3.89 |
| 4 i-C$_3$H$_7$ | 158–162 [d] | [d]1.4433 | 185–186.5 | ---do--- | 37.63 | 3.86 | 37.93 | 3.73 |
| 5 n-C$_4$H$_9$ [e] | 190–191 | 1.4490 | 150–151 | C$_{19}$H$_{24}$N$_8$O$_{14}$ | 38.77 | 4.11 | 38.67 | 4.10 |
| 6 s-C$_4$H$_9$ | 178–186 [f] | [f]1.4480 | 165–166 | ---do--- | 38.77 | 4.11 | 38.63 | 4.18 |
| 7 t-C$_4$H$_9$ [g] | 170–173 | 1.4431 | 216–217 | ---do--- | 38.77 | 4.11 | 38.87 | 3.80 |
| 8 C$_6$H$_{11}$ [h] (Cyclohexyl) | 80 (0.5 mm.) | 1.4820 | 182.5–183.5 | C$_{21}$H$_{26}$N$_8$O$_{14}$ | 41.04 | 4.26 | 41.05 | 4.29 |

[a] v. Braun et al., Ber., 70, 979 (1937) report B. P. 138–139°; M. P. of picrate 227°.
[b] Whitmore (supra) reports B. P. 156° (735 mm.); $n_D^{20}$ 1.4441; M. P. of picrate 193°.
[c] Anal. of diamine: Calcd. for C$_6$H$_{16}$N$_2$: C, 62.01; H, 13.91. Found: C, 61.99; H, 13.81.
[d] Cope, private communication, reports B. P. 161–162°; $n_D^{25}$ 1.4394.
[e] Anal. of diamine: Calcd. for C$_7$H$_{18}$N$_2$: C, 64.52; H, 13.95. Found: C, 64.61; H, 13.75. German Patent 598,185 (C. A., 28, 5474 (1934)) reports B. P. 60° (1 mm.).
[f] Cope, private communication, reports B. P. 72° (13.5 mm.); $n_D^{25}$ 1.4427.
[g] Anal. of diamine: Calcd. for C$_7$H$_{18}$N$_2$: C, 64.52; H, 13.95. Found: C, 64.62; H, 13.81.
[h] Anal. of diamine: Calcd. for C$_9$H$_{20}$N$_2$: C, 69.16; H, 12.92. Found: C, 69.10; H, 12.90.

TABLE IV 7-chloro-4-alkylaminopropylaminoquinolines

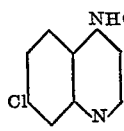

| R | M. P., °C. | Formula | Calcd. % C | Calcd. % H | Found % C | Found % H |
|---|---|---|---|---|---|---|
| 1 CH$_3$ [a] | 88.5–90.5 | C$_{13}$H$_{16}$N$_3$ClO [b] (monohydrate) | 58.29 | 6.79 | 59.06 | 6.58 |
| 2 C$_2$H$_5$ | 80–83 | C$_{14}$H$_{20}$ClN$_3$O (monohydrate) | 59.67 | 7.15 | 60.67 | 7.47 |
| 3 n-C$_3$H$_7$ | 101–102.5 | C$_{15}$H$_{20}$ClN$_3$ | 64.87 | 7.27 | 64.78 | 7.43 |
| 4 i-C$_3$H$_7$ | 98–100 | C$_{15}$H$_{22}$ClN$_3$O [c] (monohydrate) | 60.89 | 7.51 | 60.93 | 7.47 |
| 5 n-C$_4$H$_9$ | 100–103.5 | C$_{16}$H$_{22}$ClN$_3$ [d] | 65.84 | 7.61 | 64.82 | 7.08 |
| 6 s-C$_4$H$_9$ | 96.5–98 | C$_{16}$H$_{22}$ClN$_3$ | 65.84 | 7.61 | 64.50 | 7.13 |
| 7 t-C$_4$H$_9$ | 153–154 | ---do--- | 65.84 | 7.61 | 65.94 | 7.34 |
| 8 C$_6$H$_{11}$ (Cyclohexyl) | 109–112 | C$_{18}$H$_{24}$ClN$_3$ | 68.01 | 7.63 | 67.91 | 7.54 |

[a] Temperature of oil bath during coupling was 135°.
[b] Neut. equiv., calcd. for monohydrate, 140.9. Found (from titration curve), 142.3.
[c] Cope, private communication, reports M. P. 107.5–108° C. for the anhydrous base.
[d] Neut. equiv., calcd.: 145.9. Found (from titration curve) 157.

TABLE V

7-chloro-4-alkylaminopropylaminoquinoline monosulfates

| | R | M. P., °C.[a] | Molecular weight calcd.[b] | Found | Formula | Calcd. % | | Found % | |
|---|---|---|---|---|---|---|---|---|---|
| | | | | | | C | H | C | H |
| 1 | $CH_3$ | 230–232 | 347.9 | 346.8 | $C_{13}H_{18}ClN_3O_4S$ | 44.87 | 5.23 | 44.40 | 5.46 |
| 2 | $C_2H_5$ | 265–269 | 361.8 | 362.8 | $C_{14}H_{20}ClN_3O_4S$ | 46.45 | 5.57 | 46.76 | 5.69 |
| 3 | $n\text{-}C_3H_7$ | 271–274 | 375.8 | 371.2 | $C_{15}H_{22}ClN_3O_4S$ | 47.94 | 5.91 | 47.75 | 6.05 |
| 4 | $i\text{-}C_3H_7$ | 265–270 | 375.8 | 376 | ----do---- | 47.94 | 5.91 | 48.08 | 6.01 |
| 5 | $n\text{-}C_4H_9$ | 278–286 | 389.8 | 393.4 | $C_{16}H_{24}ClN_3O_4S$ | 49.28 | 6.22 | 48.93 | 6.35 |
| 6 | $s\text{-}C_4H_9$ | 282–285 | 389.8 | 394.6 | ----do---- | 49.28 | 6.22 | 48.71 | 6.19 |
| 7 | $t\text{-}C_4H_9$ | 250–252 | 194.9 | 201.0 | ----do---- | 49.28 | 6.22 | 49.23 | 6.47 |
| 8 | $C_6H_{11}$ (Cyclohexyl) | 310–315 | 208.0 | 214.5 | $C_{18}H_{26}ClN_3O_4S$ | 51.97 | 6.31 | [d] 52.16 | 6.57 |

[a] All of the salts melt with decomposition.
[b] Molecular weights obtained by doubling the neutral equivalent, obtained from a titration curve using a pH meter.
[c] This value was obtained after drying fourteen hours in vacuo at 140°; a sample dried two hours at 61° gave C, 43.25; H, 5.67. The salt contains somewhat less than one molecule of water of crystallization; calcd. water content of monohydrate: 4.9%; loss on drying to constant weight in vacuo at 140°: 3.2%.
[d] Sample dried to constant weight at 140° in vacuo.

In order to illustrate the therapeutic advantages of the compounds of the type (I) in accordance with the present invention, test data for 7-chloro-5-(ethylaminopropylamino)quinoline may be taken as representative. This particular compound (SN 13,588), on the basis of tests against gallinaceum in the chick, is roughly four times as active as SN 7618. On the basis of toxicity tests in the mouse, the rat and the dog, SN 13,588 is, respectively, 0.4, 0.5 and 0.25 as toxic as SN 7618, and in the monkey, the data indicate that SN 13,588 is also less toxic than is SN 7618, although in this test subject the relative values have not as yet been quantitatively determined. It is therefore apparent that SN 13,588 is no less effective as a suppressive antimalarial than SN 7618 and also that it is much less toxic to the host than is the particular reference compound.

It will be apparent to those skilled in the art that many variations may be made in the procedure described in the example, without departing from the basic principles involved. All such variations, modifications or extensions are to be understood as included within the scope of the appended claims.

We claim:

1. A new series of compounds composed of the group consisting of the free bases having the structural formula

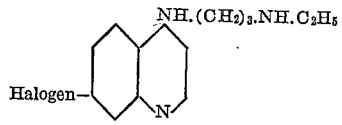

2. The compounds of claim 1 wherein the halogen radical consists of a chloro group.

DEAN S. TARBELL.
NANCY SHAKESPEARE.
JOSEPH F. BUNNETT.

REFERENCES CITED

The following references are of record in the file of this patent:

UNITED STATES PATENTS

| Number | Name | Date |
|---|---|---|
| 2,233,970 | Andersag et al. | Mar. 4, 1941 |

FOREIGN PATENTS

| Number | Country | Date |
|---|---|---|
| 742,358 | France | Dec. 7, 1932 |
| 598,185 | Germany | June 7, 1934 |

OTHER REFERENCES

Whitmore et al: Journal Amer. Chem. Soc., vol. 66, pp. 725–731 (1944).